May 28, 1957  C. L. KECK  2,793,882
MANIFOLDING DEVICE
Filed Oct. 21, 1955
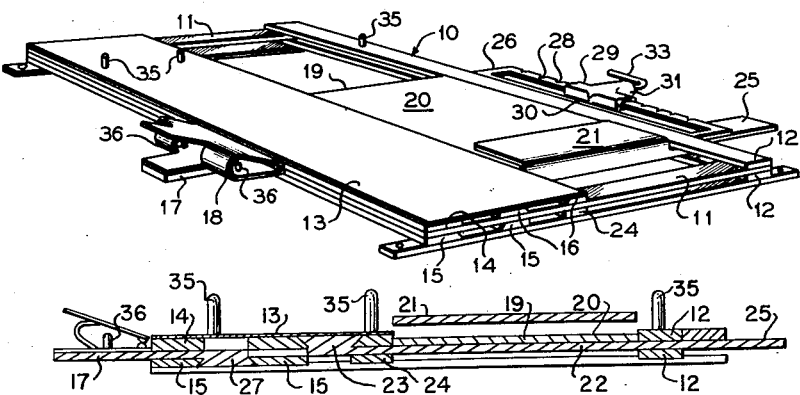
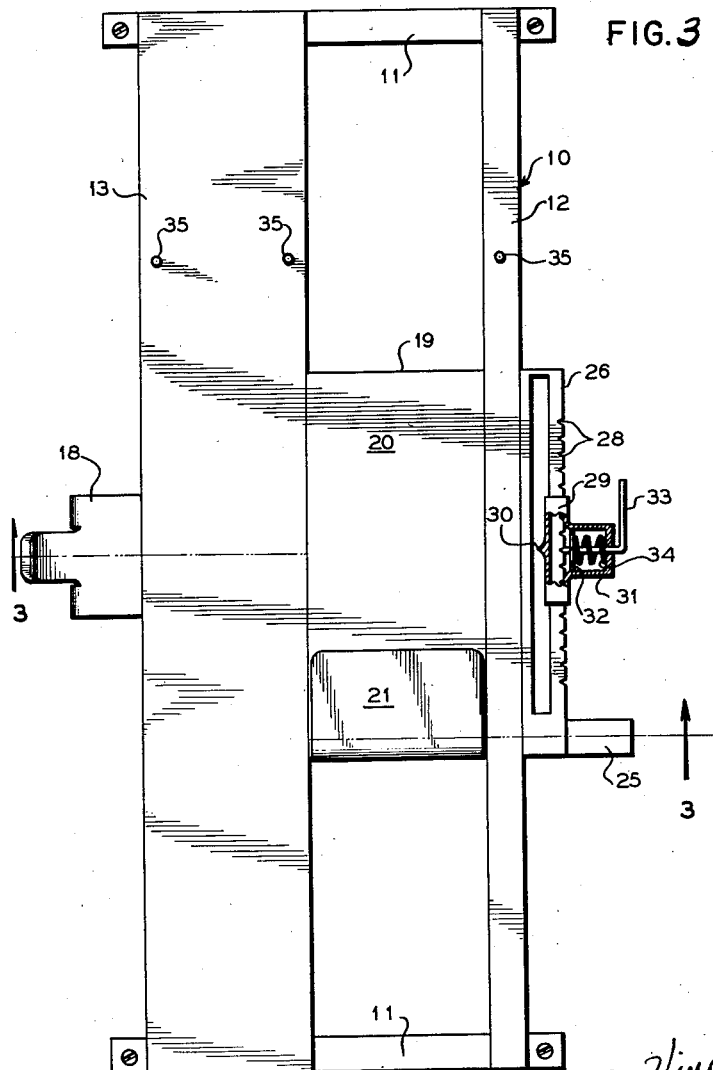
INVENTOR
CHARLES L. KECK
BY Vincent M. Creedon
ATTORNEY

United States Patent Office 2,793,882
Patented May 28, 1957

2,793,882

MANIFOLDING DEVICE

Charles L. Keck, Fort Smith, Ark.

Application October 21, 1955, Serial No. 542,044

4 Claims. (Cl. 282—29)

This invention relates to a manifolding device for use in small business operations or in small operations of large businesses.

In sales of merchandise in which time payments are made to the seller of the merchandise, there has been used a system of keeping track of the number and amount of payments in which at the time of the sale, the last copy of the sales slip is of heavy cardboard, and is a printed ledger form on which the payments made are recorded. These cards are kept by the seller of the merchandise, and at the time the purchaser makes a payment on his purchase, the payment is recorded directly on this card. It is also necessary, at this time, to prepare a receipt to give to the purchaser as his record of the payment. It is then customary to transfer the record of payment to a journal of all such payments. It is thus seen that three separate recording operations are required for each payment made by each purchaser.

Devices which are presently available for manifold bookkeeping operations generally comprise a base on which a journal sheet may be placed, means for positioning a ledger sheet over the journal sheet so that certain lines on the two sheets coincide, and means for positioning a receipt over the other two sheets. Manifolding material, such as carbon paper is interposed between the journal sheet and the ledger sheet, and between the ledger sheet and the receipt. As the agent of the seller writes out a receipt for the payment by the purchaser, the information is recorded on both the ledger sheet and the journal. When the next purchaser makes his payment, the ledger sheet is changed and the ledger sheet of that purchaser inserted, and a new receipt positioned over the ledger sheet and the journal sheet. These devices, depending on the forms of journal sheets and ledger sheets used, have been adapted for wage payment bookkeeping systems, time purchase bookkeeping systems, and other bookkeeping systems.

Because the journal sheet is usually the largest sheet, it has heretofore been thought necessary to place this sheet on the bottom, and to provide means to adjust the ledger sheets and the receipt forms so that successive spaces on the journal sheet, on the bottom of the stack of forms, are filled successively. Quite obviously, however, the devices presently available cannot be used where the ledger sheet is of a thickness more than ordinary paper. The pressure of the person writing on the receipt will not be sufficient to be transferred through the cardboard ledger sheet to the journal sheet. The present devices therefore cannot be used in the time payment system discussed above, where the ledger sheet, in order that it may be durable and able to withstand repeated handling for the period over which the time payments are made, is of heavy cardboard.

It is therefore an object of the present invention to provide a manifolding device which is adapted for use with a time payment system or the like in which the ledger sheet on which the payments made by the purchaser are recorded is of heavy cardboard.

It is a further object of this invention to provide a manifolding device in which a receipt, a ledger card of heavy cardboard, and a journal sheet may be filled out in one operation to record a payment by a purchaser.

Other and further objects of the present invention will become apparent from the following description of a preferred form of the invention, taken together with the appended claims and the accompanying drawings, in which:

Fig. 1 is a perspective view of the device according to the invention;

Fig. 2 is a plan view of the device of Fig. 1, partly in section; and

Fig. 3 is a sectional view along line III—III of Fig. 2.

Referring to the figures, in which like reference numbers identify like parts, the device is supported on a frame 10 which consists of two vertically spaced pairs of cross pieces 11, one pair positioned at the top or head of the device, and the other pair positioned at the bottom or foot of the device. The lower cross piece of each pair may have means thereon for securing the frame to a supporting surface. In the present instance there are shown holes through which bolts or screws may be passed to secure the frame to the supporting surface. Along one side of the device and extending between the pairs of cross pieces is a pair of vertically spaced longitudinal side rails 12. The lower of these rails is positioned with its ends on top of the lower of the cross pieces 11, and the upper cross pieces 11 are positioned on top of the lower longitudinal side rail 12. The upper side rail is positioned with its ends on the upper cross pieces 11. Thus the thickness of the side rails 12 determines the spacing of the cross pieces 11, and the thickness of the cross pieces 11 determines the spacing of the side rails 12.

Spaced laterally from the lower longitudinal side rail 12 with its ends on the lower cross pieces 11 is carriage guide support 24, which extends between the lower cross pieces 11 parallel to the longitudinal side rails 12. Further along the lower cross pieces 11, with their ends resting thereon, is a pair of laterally spaced spring clip guide rails 15 which extend parallel to the longitudinal side rails 12. The edges of these spring clip guide rails 15 which face each other are beveled to form a keyway. The upper cross pieces 11 extend over the ends of the carriage guide support 24 and the spring clip guide rails 15 are supported thereon.

Spaced laterally from the upper longitudinal side rail 12, with their ends on the upper cross pieces 11, is a pair of laterally spaced carriage guide rails 16 which extend parallel to the longitudinal side rails 12. The edges of these carriage guide rails which face each other are beveled to form a keyway. The carriage guide rail 16 farthest from the longitudinal side rails 12 is positioned over the spring clip guide rail 15 closest to the longitudinal side rails. Spaced from the latter carriage guide rail 16 and positioned over the other spring clip guide rail 15 is writing surface support 14, which has its ends resting on the upper cross pieces 11.

Positioned over the carriage guide rails 16 and the writing plate support 14 is writing plate 13. The edge closest to the longitudinal side rails 12 is parallel thereto, and in addition is even with the carriage guide rail 16 immediately beneath that edge and with the edge of the carriage guide support 24. The longitudinal side rails 12 and the edges of the writing plate 13, the carriage guide rail 16 and the carriage guide support 24 thus define a slideway having parallel sides.

Within the slideway thus defined is positioned a carriage 19 comprising a carriage writing plate 20 with a retaining plate 21 projecting upwardly from the bottom edge of the carriage writing plate 20 and then extending parallel to the surface of the carriage writing plate 20. The surface of the carriage writing plate 20 is lower than the surface of the writing plate 13 by the thickness of the cardboard of which a ledger card is to be made.

Secured to the carriage 19 is carriage support 22 which extends between the carriage guide rail closest to the carriage and the carriage guide support 24 and terminates beneath the keyway between the carriage guides 16, and which also extends between the longitudinal guide rails 12 and terminates in a handle extension 25. Integral with the end of the carriage support 22 at the end beneath the carriage guide keyway is carriage guide 23 which fits slidably into the carriage guide keyway defined between the carriage guide rails 16.

Mounted on the other extremity of the carriage support 22 with one edge slidable along the upper longitudinal guide rail 12 is an index carrier 26 in the form of a rectangular frame. Along the outside member of the frame 26 are a series of notches 28. An index in the form of a tubular member slidable on the outside member of frame 26 carries a pointer 30 and means to position the pointer on the index carrier 26. Projecting outwardly from the index 29 is cylinder 31 having a piston 32 slidable therein. A setting lever 33 having a point on the end adjacent the notched edge of the outside member of frame 26 is fastened in the piston 32 and extends axially of the cylinder 31 through the end thereof, where it is bent at right angles to the axis of the cylinder. Between the end of the cylinder 31 and the piston 32 is a spring 34. The pointer 30 is opposite the axis of the cylinder 31.

Projecting from between the writing plate support 14 and the outer spring clip guide rail 15 is spring clip carrier 17. One end thereof terminates over the keyway between spring clip guide rails 15 and has integral therewith spring clip guide 27 which is slidable in the keyway defined between the spring clip guide rails 15. On the other end of the spring clip carrier 17 is spring clip 18, which is a conventional clip for a sheaf of paper and which is spring urged to the closed position. Binder posts 36 are mounted in the spring clip 18.

Across the upper portion of the writing plate 13 is a plurality of binder posts 35, and on the upper longitudinal side rail 12 in alignment with these posts is an additional post 35.

The operation of the device is as follows:

A heavy cardboard ledger sheet is positioned on the carriage writing plate 20 with the lower end beneath the retaining plate 21. A journal sheet is then placed on the writing plate 13 and positioned by placing the holes in the journal sheet over the binder posts 35. The index 29 and the pointer 30 thereon are adjusted along the outside member of the frame by means of the setting lever 33 to the space on the cardboard ledger which is to be filled in. The carriage 19 is then moved along the space between the longitudinal side rails 12 and the writing plate 13 until the pointer 30 is aligned with the next space on the journal sheet to be filled in. A sheaf of receipt forms is then placed over binder posts 36 and clipped under spring clip 18, and the spring clip is moved along the writing plate 13 until the space on the receipt to be filled in is opposite the pointer 30. Carbon paper or the like is then placed between the ledger sheet and the journal sheet and between the journal sheet and the bottom receipt, the receipts on the top of the bottom one being turned back, and the entry is made on the receipt, which is then torn off. The single entry is recorded on all three sheets.

Specific forms of receipts, journal sheets and ledger cards have not been shown since various forms may be used depending on the system to be employed. Further, paper incorporating carbon paper on the back thereof may be utilized for the forms for the receipts and for the journal sheets, thereby eliminating the necessity for separate sheets of carbon paper.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A manifolding device comprising a frame having vertically spaced longitudinal side rails, a writing plate having binder posts thereon, and top and bottom cross pieces defining a slideway, a carriage slidably mounted in said slideway having a writing surface thereon below the level of said writing plate, sheet retaining means on said carriage, means projecting laterally of said carriage between said longitudinal side rails for sliding said carriage in said slideway and for indicating a point on the length of said carriage in the direction of sliding, and spring clip means slidable along said writing plate in the same direction as said carriage.

2. A manifolding device as claimed in claim 1 in which said sheet retaining means comprises a retaining plate projecting upwardly from the bottom edge of said carriage and then parallel to and spaced from the surface of said carriage, whereby a card may be retained between said retaining plate and the carriage.

3. A manifolding device as claimed in claim 1 in which said means projecting laterally from the carriage comprise a handle extension rigidly attached to said carriage and extending beyond the longitudinal side rails, an index carrier projecting from the handle extension parallel to the longitudinal side rails and spaced therefrom, an index slide mounted on said index carrier, and means on said index carrier and said index for positioning said index on said index carrier.

4. A manifolding device as claimed in claim 3 in which said means on said index carrier and said index comprise a setting lever resiliently and slidably mounted on said index for movement perpendicular to the movement of said index carrier, said index carrier having notches therein for receiving the end of said setting lever, whereby said setting lever engages one of said notches and fixes the index in position on said index carrier.

References Cited in the file of this patent

UNITED STATES PATENTS

| | | |
|---|---|---|
| 2,381,197 | Zalkind | Aug. 7, 1945 |
| 2,623,762 | Nelson | Dec. 30, 1952 |